US009973974B2

(12) United States Patent
Jain et al.

(10) Patent No.: US 9,973,974 B2
(45) Date of Patent: May 15, 2018

(54) DATA RATE CONTROL IN SOFT HANDOFF AND DURING CELL-SWITCHING (71) Applicant: QUALCOMM Incorporated, San Diego, CA (US)

(72) Inventors: Avinash Jain, San Diego, CA (US); David Puig Oses, Caldes de Montbui (ES); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/482,661

(22) Filed: Apr. 7, 2017

(65) Prior Publication Data

US 2017/0215108 A1 Jul. 27, 2017

Related U.S. Application Data (63) Continuation of application No. 10/914,593, filed on Aug. 9, 2004, now Pat. No. 9,629,030.
(Continued)

(51) Int. Cl.
*H04W 28/22* (2009.01)
*H04L 1/00* (2006.01)
(Continued)

(52) U.S. Cl.
CPC .......... *H04W 28/22* (2013.01); *H04L 1/0002* (2013.01); *H04L 1/0017* (2013.01);
(Continued)

(58) Field of Classification Search
CPC ... H04L 1/0002; H04L 1/0003; H04L 1/0023; H04W 28/22; H04W 36/0072; H04W 36/0077; H04W 36/165; H04W 36/18; H04W 36/22; H04W 36/26; H04B 7/264; H04B 2201/70703
See application file for complete search history.

(56) References Cited

U.S. PATENT DOCUMENTS 6,112,080 A 8/2000 Anderson et al.
6,343,218 B1 1/2002 Kaneda et al.
(Continued)

FOREIGN PATENT DOCUMENTS

CA 2438527 A1 8/2002
CA 2565779 A1 11/2005
(Continued)

OTHER PUBLICATIONS

Cdma2000 High Rate Air Interface Specification IS-856, Jan. 2002.
(Continued)

*Primary Examiner* — Devan Sandiford
(74) *Attorney, Agent, or Firm* — Holland & Hart, LLP (57) ABSTRACT Systems and methods for controlling a data rate of a transmission in a wireless communication system during handoff are described herein. In some embodiments, controlling the data rate includes receiving transmissions from a plurality of base stations, wherein each received transmission includes a data rate control indicator, and adjusting the data rate of the transmission during handoff based on the data rate control indicators from the plurality of base stations.

19 Claims, 5 Drawing Sheets

Related U.S. Application Data (60) Provisional application No. 60/511,254, filed on Oct. 14, 2003, provisional application No. 60/529,135, filed on Dec. 11, 2003.

(51) Int. Cl.

| | | |
|---|---|---|
| *H04W 36/18* | (2009.01) | |
| *H04L 1/16* | (2006.01) | |
| *H04L 1/18* | (2006.01) | |
| *H04W 36/00* | (2009.01) | |
| *H04L 5/00* | (2006.01) | |

(52) U.S. Cl.
CPC .......... *H04L 1/0025* (2013.01); *H04L 1/1671* (2013.01); *H04L 1/1812* (2013.01); *H04W 36/18* (2013.01); *H04L 5/0055* (2013.01); *H04W 36/0055* (2013.01); *H04W 36/0061* (2013.01); *H04W 36/0072* (2013.01)

(56) References Cited

U.S. PATENT DOCUMENTS

| | | | |
|---|---|---|---|
| 6,393,276 | B1 | 5/2002 | Vanghi |
| 6,611,507 | B1 | 8/2003 | Hottinen et al. |
| 6,661,783 | B1 | 12/2003 | Watanabe et al. |
| 6,804,210 | B2 | 10/2004 | Bender et al. |
| 6,876,641 | B2 | 4/2005 | Banister |
| 6,996,056 | B2 | 2/2006 | Chheda et al. |
| 7,120,134 | B2 | 10/2006 | Tiedemann et al. |
| 7,158,504 | B2 | 1/2007 | Kadaba et al. |
| 8,930,569 | B2 | 1/2015 | Nagaraj |
| 2002/0141349 | A1 | 10/2002 | Kim et al. |
| 2002/0154610 | A1 | 10/2002 | Tiedemann et al. |
| 2002/0172217 | A1 | 11/2002 | Kadaba et al. |
| 2002/0183066 | A1 | 12/2002 | Pankaj |
| 2003/0045237 | A1* | 3/2003 | Gardner .................. G10L 19/22 455/63.1 |
| 2003/0152031 | A1 | 8/2003 | Toskala et al. |
| 2004/0151122 | A1 | 8/2004 | Lau et al. |
| 2005/0030911 | A1 | 2/2005 | Tiedemann et al. |
| 2005/0030964 | A1 | 2/2005 | Tiedemann et al. |
| 2005/0041618 | A1 | 2/2005 | Wei et al. |
| 2005/0141454 | A1 | 6/2005 | Jain et al. |
| 2005/0152308 | A1 | 7/2005 | Seol et al. |
| 2006/0018258 | A1 | 1/2006 | Teague et al. |
| 2006/0029021 | A1 | 2/2006 | Sakawa et al. |
| 2006/0194585 | A1* | 8/2006 | Usuda .................... H04W 28/22 455/452.1 |
| 2007/0021106 | A1* | 1/2007 | Kawasaki ......... H04W 72/1289 455/412.1 |
| 2008/0139133 | A1* | 6/2008 | Usuda .................... H04L 47/10 455/95 |

FOREIGN PATENT DOCUMENTS

| | | |
|---|---|---|
| EP | 0986281 A2 | 3/2000 |
| RU | 1998116734 | 9/1994 |
| WO | 9952077 A1 | 10/1999 |
| WO | 0062440 A2 | 10/2000 |
| WO | 2002065664 | 8/2002 |
| WO | 02082108 A1 | 10/2002 |
| WO | 05109719 | 11/2005 |
| WO | 2006023131 A1 | 3/2006 |

OTHER PUBLICATIONS

C.S0011-0, 3rd Genereation Partnership Project 2 (3GPP2), Dec. 1999, "Recommended Minimum Performance Standards for Dual-Mode Spread Spectrum Mobile Stations", ANSI/TIA/EIA-98-C, Nov. 1999.

Hwang, Gyung-Ho et al.: "Distributed Rate Control for Throughput Maximization and QoS Support in WCDMA System," IEEE VTS 54th Vehicular Technology Conference, 2001: Atlantic City, NJ, USA, (Oct. 7, 2001), vol. 3, pp. 1721-1725, doi: 10.1109/VTC.2001.956494.

International Preliminary Report on Patentability—PCT/US04/033787, IPEA/US, dated Dec. 13, 2006.

International Search Report—PCT/US04/033787, International Search Authority—European Patent Office, dated Feb. 9, 2005.

Taiwan Search Report—TW093131024—TIPO—dated Mar. 28, 2011.

TIA/EIA-95-B "Mobile Station-Base Station Compatibility Standard for Wideband Spread Spectrum Cellular Systems", Mar. 1999, XP-002145331.

TSG-C WG3 Chair, "C30-20030812-084R1 Harm_RL_9", Aug. 19, 2003, 10 pages.

Written Opinion—PCT/US04/0033787, International Search Authority—European Patent Office, dated Feb. 9, 2005.

* cited by examiner

DATA RATE CONTROL IN SOFT HANDOFF AND DURING CELL-SWITCHING

RELATED APPLICATIONS

The present Application for Patent is a continuation of U.S. application Ser. No. 10/914,593 entitled "DATA RATE CONTROL IN SOFT HANDOFF AND DURING CELL-SWITCHING" filed Aug. 9, 2004, which claims priority to Provisional Application No. 60/511,254 entitled "DATA RATE CONTROL IN SHO AND DURING CELL-SWITCHING" filed Oct. 14, 2003, and Provisional Application No. 60/529,135, entitled "DATA RATE CONTROL IN SHO AND DURING CELL-SWITCHING" filed Dec. 11, 2003, each of which is expressly incorporated by reference herein.

BACKGROUND

Field

The invention relates generally to wireless communication, and more specifically to data rate control in a wireless communication system.

Background

Wireless communication systems are used in many applications including, for example, paging, wireless local loops (WLL), Internet telephony, wireless telephone and satellite communication systems. An exemplary application of a wireless telephone system is a cellular telephone system for remote subscribers which are often mobile. In a typical cellular telephone system mobile subscribers, or mobile stations, transmit and receive signals from various base stations within a wireless network infrastructure of the communication system as the mobile station moves about.

Modern wireless communication systems, such as cellular telephone system, are typically designed to allow multiple users, or subscribers, to access a common communications medium. Various techniques have been developed for these multiple access wireless communication systems including code division multiple access (CDMA), time division multiple access (TDMA), and frequency division multiple access (FDMA). These multiple access techniques encode, modulate, decode, and demodulate signals transmitted and received between the multiple users and the wireless network infrastructure, thereby enabling simultaneous communication among multiple users and allowing for a relatively large capacity for the communication systems.

In a wireless communication system based on CDMA, the available radio frequency (RF) spectrum is shared efficiently among a number of users. Wireless communication systems typically transmit voice messages and more recently, systems with enhanced capacity for data services are also available. An example of such a data-services communication system is the high data rate (HDR) system that conforms to the Telecommunications Industry Association/Electronic Industries Alliance (TIA/EIA) cdma2000 High Data Rate Air Interface Specification IS-856, January 2002 (the IS-856 standard).

In a wireless communication system, such as one based on CDMA or one of the other multiple access techniques mentioned, users are often mobile. As a user moves about they may move out of the coverage area of a sector of a base station or out of the coverage area of the base station itself. As a user, also referred to as a mobile or a mobile station, moves in and out of different coverage areas such that the user leaves one coverage area and enters another, to maintain communications a technique known as a "handoff" occurs.

In a handoff the mobile station begins communicating with a sector of a base station, simply referred to as a base station, in the coverage area it is entering and terminates communication with the base station in the coverage area it is leaving. Using a technique referred to as "soft handoff" the mobile station will simultaneously be in communication with the two base stations during the handoff. In other words, the mobile will remain in communication with the base station whose coverage area the mobile is leaving while also establishing communication with the base station whose coverage area the mobile is entering. In such a technique, both the base stations either jointly or independently decode the mobile stations transmission. Communicating with both base stations during the soft handoff reduces the chance of a dropped call or other unintentional loss of communication.

The data rate that can be supported by each of the two base stations involved in a handoff may be different, for example, due to the level of congestion of the respective base station. The level of congestion in a system may be determined by monitoring the data rates of users, and the received signal strength required to achieve a desired quality of service (QoS). The communication link from the mobile to the base station is called the reverse link or uplink. In a wireless CDMA system, the reverse link capacity is interference-limited and one measure of the cell congestion is the total received power over the level of the thermal noise at a base station. The total received power over the thermal noise is commonly referred to as the "rise over thermal" (ROT) and corresponds to loading of the reverse link. Typically, it is desirable to maintain the ROT near a predetermined value. If the ROT is too high, the coverage of the cell, that is the distance over which the base station of the cell can communicate, is reduced and the reverse link is less stable. A reduced cell coverage (such as from excessive ROT) can adversely affect the data rate that can be supported in the cell and the mobile stations at the edge of the cell may drop their calls. The coverage of the cell reduces with high ROT due to an increase in the amount of transmit energy required at the mobile station to provide a target energy level at the base station. Typically mobiles are somewhat limited in the transmit power they have and thus a requirement to increase transmit power corresponds to a decreased range. A low ROT can indicate that the reverse link is not heavily loaded, thus indicating that available data rate capacity is potentially being wasted.

If a base station and a mobile involved in a handoff can support different data rates, then the data rate of the mobile station during a handoff may not be optimal. For example, if the base station to which the mobile is handing off can support a higher data rate than is being used by the mobile, then the mobile may be operating at a lower data rate than is possible, in which case there may be a waste of system resources. If the base station to which the mobile is handing off cannot support a data rate as high as the mobile is operating with, then the mobile can be causing increased interference with other users and could be degrading system performance. A form of rate management in a soft-handoff region can be achieved with co-ordination between base-stations. However, the co-ordination between base-stations over the infrastructure, or backhaul, may be slow or there may not be any support to carry out the co-ordination between two base stations.

There is therefore a need in the art for improving distributed data rate control during handoff in a wireless communication system.

SUMMARY

Embodiments disclosed herein address the above stated needs by providing methods and apparatus for controlling a data rate of a transmission in a wireless communication system during handoff. A mobile station transmission is received and decoded by multiple base stations in the mobile station's handoff list. Any base station in the handoff list that successfully decodes a transmission sends an acknowledgement on the downlink to the mobile station. The mobile station then determines a rate control command based on transmissions from the base stations that include an acknowledgement message. The mobile adjusts its data rate of transmission in accordance with the rate control command.

In another aspect, a base station other than the base station that has sent the acknowledgement message may desire to communicate a desired data rate command to the mobile station. The base station desiring to send a rate command may be the primary base station that has the Quality of Service (QoS) and other scheduling information, or the base station may be a non-primary base station that is heavily congested and may desire to lower the rate of the transmission. The desired rate command may then be used by the mobile in determining the data rate of transmission based on rate commands from the primary base station and the non-primary base stations.

Controlling a data rate of transmission in a wireless communication system during handoff can include receiving transmissions from a plurality of base stations, then determining a plurality of rate control commands from the respective received transmissions from the plurality of base stations. The rate control commands may then be combined, and the data rate of transmission adjusted in accordance with the combined rate control commands. In the case of automatic repeat request (ARQ), non co-located base stations in handoff, may decode the transmissions independently and send acknowledgement (ACK) asynchronously. The asynchronous ACKs leads to synchronization problems in transmitting a rate control command. The base stations that do not ACK the transmission may not send a rate control command that may be interpreted as a HOLD state of the rate control command. Aspects relating to this scenario are described that provide effective ways of combining rate control commands in handoff while being ACKed by non co-coordinating multiple base stations.

Combining the rate control commands can include applying weighting factors to the received rate control commands. For example, the rate control command of a primary base station can be assigned a larger weighting factor than commands from non-primary base stations. Combining the rate commands can also include establishing a rate control command based on a desired quality of service for the primary base station so that the primary base station controls the data rate ramp-up and non-primary base stations provide data rate control based on system congestion.

A further aspect of combining the rate control commands from multiple base stations includes decreasing the data rate if at least one of the data rate commands is for a decreased rate. Another aspect of combining the rate control commands includes maintaining the data rate if none of the data rate commands is for a decreased rate and at least one of the data rate commands is a command to hold the data rate, for example if the data rate command is a null command. Yet another aspect of combining the rate control commands includes maintaining the data rate if none of the data rate commands is for a decreased rate, an increase rate or a command to hold the data rate, but instead is a different command, such as a null command. A further aspect of combining the rate control commands includes increasing the data rate if none of the data rate commands is for a decreased rate or a command to hold the data rate and at least one data rate command is for an increased data rate.

Other features and advantages of the present invention should be apparent from the following description of exemplary embodiments, which illustrate, by way of example, aspects of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
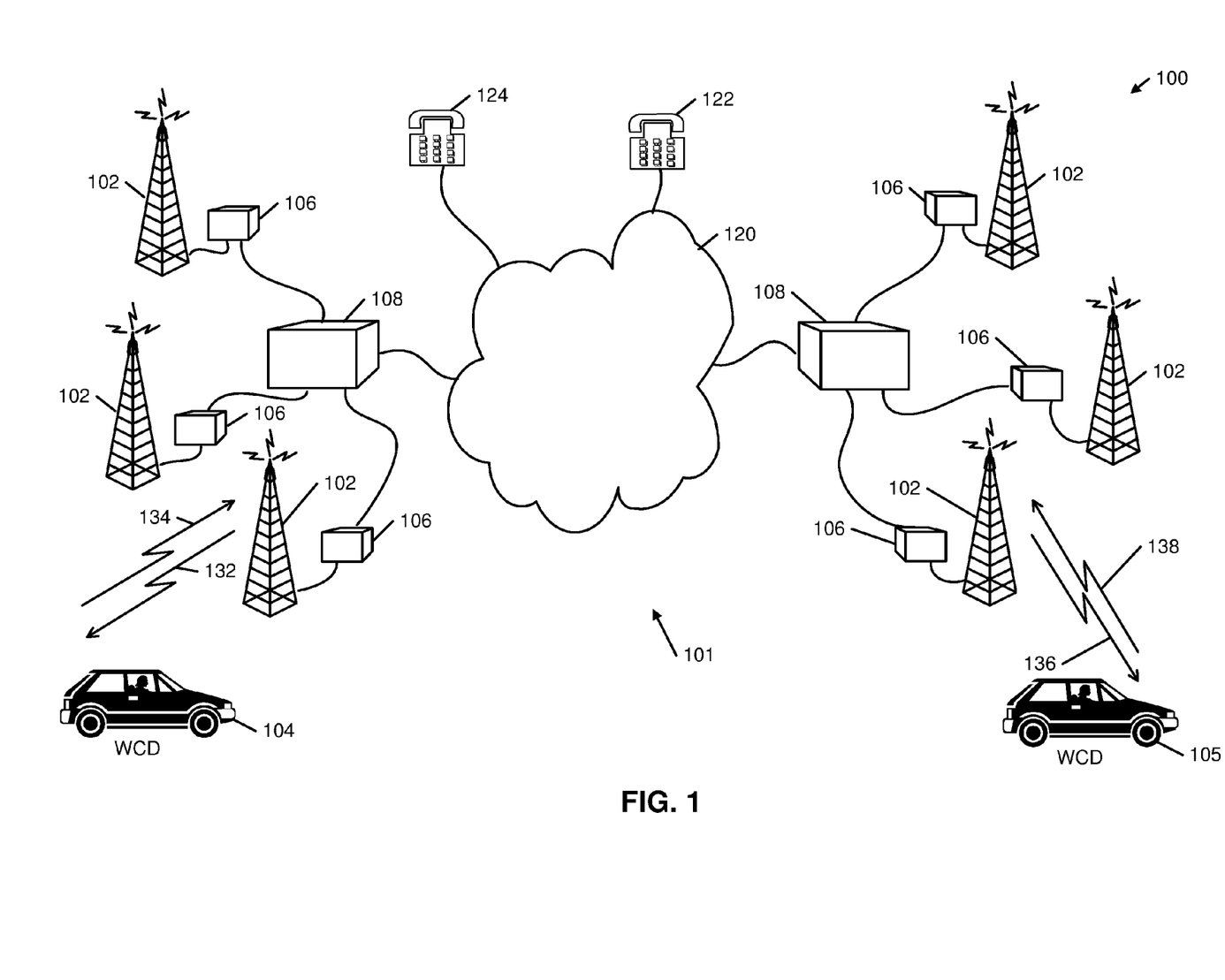
FIG. 1 shows portions of a communication system 100 constructed in accordance with the present invention.

FIG. 1 shows portions of a communication system 100 constructed in accordance with the present invention. The communication system 100 includes infrastructure 101, multiple wireless communication devices (WCD) or mobile stations (MS) 104 and 105, and landline communication devices 122 and 124. In general, WCDs may be either mobile or fixed, and "WCD" will be used interchangeably with "MS" and "mobile."

The infrastructure 101 includes components such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, the switching network 120 may be the public switched telephone network (PSTN).

The term "forward link" refers to the signal path from the infrastructure 101 to a WCD 104, 105 and the term "reverse link" refers to the signal path from a WCD to the infrastructure. As shown in FIG. 1, WCDs 104 and 105 receive signals 132 and 136 on the forward link and transmit signals 134 and 138 on the reverse link. In general, signals transmitted from a WCD 104 and 105 are intended for reception at another communication device, such as another remote unit, or at a landline communication device 122 and 124, respectively, and are routed through the switching network 120. For example, if the signal 134 transmitted from an initiating WCD 104 is intended to be received by a destination WCD 105, the signal is routed through the infrastructure and a signal 136 is transmitted on the forward link to the destination WCD 105. Typically, a communication device, such as a WCD or a landline communication device, may be both an initiator of and a destination for the signals.

Examples of WCDs 104 include cellular telephones, wireless communication enabled personal computers, and personal digital assistants (PDA), and other wireless devices. The communication system 100 may be designed to support one or more wireless standards. For example, the standards may include standards referred to as TIA/EIA-95-B (IS-95), TIA/EIA-98-C (IS-98), cdma2000, Wideband CDMA (WCDMA), and others.

Figure 2:
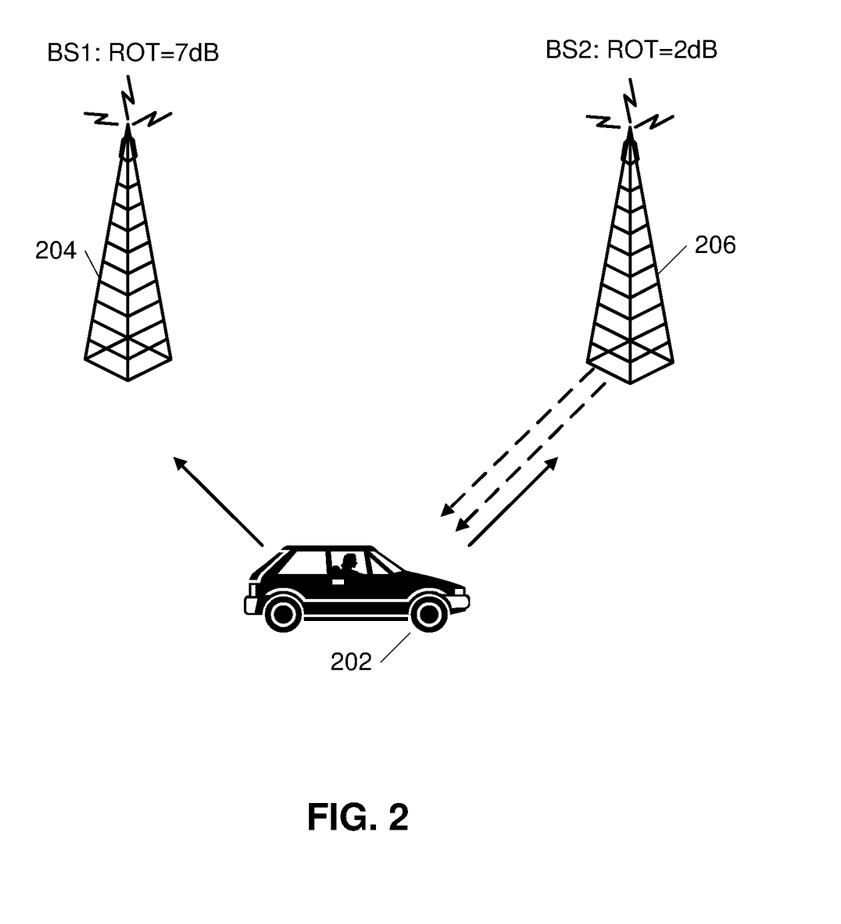
FIG. 2 is a block diagram illustrating a wireless communication device during a handoff between two base stations.

FIG. 2 is a block diagram illustrating a WCD 202 during a handoff between two base stations 204 and 206. As shown in FIG. 2, a WCD device 202 is communicating with two base stations 204 and 206. In this illustration, the primary base station 204 (BS1) is the base station whose coverage area the WCD 202 is currently in, and the non-primary base station 206 (BS2) is the base station whose coverage area the WCD 202 is entering.

The Third Generation Partnership Project 2 (3GPP2), a collaborative third generation (3G) telecommunications specifications-setting project comprising North American and Asian interests for developing global specifications for ANSI/TIA/EIA-41 Cellular Radio telecommunication Intersystem Operations network evolution of 3G, has received proposals for techniques for controlling data rate from one or many base stations during a hand off In accordance with these proposals, a base station controlling the WCD sends a dedicated rate control command (a tri-state bit) which can either be UP, HOLD, or DOWN, signifying an increase, hold or decrease in rate or traffic-to-pilot ratio of the next transmission. If the WCD is in soft-handoff, the rate control commands can be received from different base stations. The rate control commands from different base stations can be combined to obtain an effective rate control command. A drawback with this approach occurs when base station and WCD uses a technique referred to as hybrid automatic repeat request (HARQ) to improve the performance of the system. With HARQ enabled, a mobile station sends same or different encoded copy of same packet till the base station ACKs the transmission of the packet. A mobile station transmits a new packet at a new rate only when it has successfully transmitted the previous packet or has transmitted the previous packet for maximum number of times allowed. A mobile station has successfully transmitted a packet if it receives acknowledgement (ACK) from at least a single base station in its soft-handoff list. Due to this, a base station in soft-handoff sends an UP or a DOWN rate control command only when it has successfully decoded a packet and sends an ACK message on Forward Acknowledgement Channel (F-ACKCH) of the base station. A HOLD corresponds to no transmission on the rate control channel, and is power efficient when the base station is not expecting a new transmission from the mobile station. Because the quality of transmissions received by different base stations may be different, all base stations in a mobile stations soft-handoff list do not ACK the mobile at the same time. The dedicated rate control approach that works without HARQ may be redefined in a system which uses both soft-handoff across different base stations and HARQ for performance improvement. In an exemplary embodiment, a WCD monitors the Forward Rate Control Channels (F-RCCH) of a base station when it receives an acknowledgement message (ACK) on the Forward Acknowledgement Channel (F-ACKCH) from the base station. A problem with this approach can occur if the WCD 202 is in a soft handoff with the primary base station 204 and the non-primary base station 206, and the WCD 202 receives an ACK only from the non-primary base station 206. Even though 204 is a primary base station and may be receiving more interference power from the WCD 202, the lightly loaded base station 206 may decode the mobile station transmissions and send a rate control command along with ACK requesting the WCD 202 to go UP in rate. If this occurs, the primary base station 204 may not able to control the rate of the WCD 202 via rate control commands.

An exception to this rule occurs after the last transmission corresponding to a data packet is sent, at which time the WCD monitors all the F-RCCHs that are assigned to the WCD, regardless of whether or not the WCD receives ACK from a BS. However, this scheme is very sensitive to control signaling errors, including reverse packet data control channel (R-PDCCH) errors and forward-acknowledgement channel (F-ACKCH) errors. For example, R-PDCCH contains the control information indicating the transmitted rate on the data/packet channel and the transmission number (also called subpacket number) of the packet. The Subpacket number indicates how many times the packet has been transmitted and unsuccessful decoded at the base station. If the subpacket number is equal to the maximum number of transmissions allowed, then the current transmission on the packet channel is the last transmission to deliver the packet correctly to the BS. If a BS is unable to decode the R-PDCCH transmission from a WCD, the BS will be unaware that a subpacket is the last subpacket and that it should send a rate control indicator to the MS. The MS would interpret the no transmission on F-RCCH to be a HOLD command. The HOLD command prevents the WCD's rate from going up, even though the BS had no intention to send a HOLD command and may be able to support higher date rate traffic.

In another embodiment, a mobile station monitors rate control command only from the primary base station. In this approach, non-primary base stations that may receive the interference from the mobile station are not able to control the mobile station. Further, the mobile station is moving, the mobile station may enter the service area of another base station and may perform cell switching. During cell switching, the MS communicates with the primary BS1 204 by sending a predetermined number of switching frames indicating the non-primary BS2 206 will become the primary base station. The switching between base stations is over when the MS receives a Switch End Indicator from the old primary BS1 204 or when a predetermined number of switching frames have been sent. The rate control operation from the primary base station is not explicitly specified during the switching interval. Following is a description of some of the different techniques that can be used during soft handoff and cell switching where various problems are identified along with ways of addressing the problems.

Case 1

In this embodiment, an acknowledgement message (ACK) transmitted by a base station (BS) is received by the mobile station (MS) if the decoded transmission corresponded to a packet that has not been sent the maximum number of times allowed. When the MS receives the ACK, it adjusts its data rate in accordance with the rate control bit(s) transmitted from the BS that ACK the transmission. The rate control bits received by the mobile station from base stations that did not send the ACK are ignored. The mobile station monitors the rate control bit from all the base stations only when the previous transmission corresponded to a packet that was transmitted a maximum number of times allowed.

There are several advantages to this approach. One is that if the previous transmission is not the last transmission of a packet, the base station can make a rate decision for the next transmission only if it ACKs the previous transmission and expects new transmission. Also, when a base station doesn't ACK to the previous transmission from a mobile station, it doesn't send anything on the rate control command, thereby being power efficient while being sure that the rate control bit is ignored and not interpreted as HOLD by the mobile station. Another advantage is that this technique treats primary and non-primary base stations similarly. Therefore even when the primary base station changes during cell switching, the rate control operation from the base stations in soft-handoff is not influenced.

A problem with this technique can occur if there are load imbalances between the base stations involved in the handoff. For example, a problem can occur if the MS 202 is performing a soft handoff from a primary BS 204 to a non primary BS 206 and the primary BS 204 is fully loaded on the reverse link, say with a rise-over-thermal (ROT) of 7 dB, while the non-primary BS 206 has a relatively unloaded reverse-link, say with an ROT of 2 dB. In this example of load imbalance, the MS 202 may have a better reverse-link with the non primary BS 204, since the transmission from the MS 202 sees less interference. On the other hand, the reverse-link with the primary BS 204 may be weak, even though the primary BS 204 may have a better forward-link to the MS 202. In this scenario, the non-primary BS 206 can decode the MS 202 data packet and send an ACK message to the MS 202. Since the non-primary BS 206 is lightly loaded, it will send rate control bit(s) to increase the rate of the MS The primary BS 204, on the other hand, may be fully loaded, or congested, and if it receives the MS 202 transmission at a lower SNR it may not be able to decode the transmission and send an ACK. If the primary BS 204 doesn't decode the transmission from MS 202, it doesn't send a rate control command to the MS 202, thereby losing control on the MS 202 transmission even though it receives more interference from the MS 202. If the MS 202 adjusts its data rate in accordance with the rate control bit(s) sent by the lightly loaded BS 206 and increases its data rate, this can result in the congested primary BS 204 receiving more and more interference from the MS 202, which it will be unable to adequately control. One solution to this problem is to have the primary BS 204 decode the reverse packet data control channel (R-PDCCH) transmitted by the MS 202 and check the data rate. If the MS 202 data rate is higher than desired by the primary BS 204, the primary BS 204 can control the MS 202 transmission rate by requesting the non-primary BS 206 send RC bit(s) to the MS to decrease the MS data rate. The primary BS can send the request to the non primary BS directly, or through the communication system infrastructure or backhaul, or in other ways appropriate to the system configuration.

Another problem with this technique (transmitting ACK from BS to MS) is that both the primary BS 204 and the non-primary BS 206 should be aware of the QoS requirements of the mobile station. In most scenarios, a non-primary BS 206 that decodes the MS transmissions only rarely doesn't have accurate QoS information and current requirements of the MS 202. In the absence of QoS requirements of the MS 202, the non-primary BS 206 will not be able to send an appropriate rate control command to the MS unless the primary and non-primary BS co-ordinate via the backhaul to exchange this information.

Case II

In a second embodiment, the MS 202 adjusts its data rate in accordance with RC bit(s) only from a primary BS 204. In other words, the MS 202 adjusts its data rate in accordance with rate control bit(s) transmitted by the BS 204 currently designated as the primary BS even if an ACK is received from a non-primary BS 206. This technique has an advantage in that if the primary BS does not want to change the data rate it will not transmit a rate control bit(s), which is recognized as a HOLD command by the MS and saves power on the BS forward link (FL). Thus, even if a non-primary BS 206 sends an ACK to the MS, the non-primary BS 206 doesn't send rate control bit(s) to the MS. If the primary BS 204 is congested, it can send DOWN rate control bit(s) and the MS will adjust its data rate accordingly even if a non-primary BS sends an ACK. In accordance with this embodiment, only a primary BS 204 needs to maintain the QoS information and update the current requirements of the mobile station.

A problem with this technique is that the non-primary BS 206 has no control on the power it receives from the MS transmission that acts as interference in reception of the other MS transmissions. In the case of imbalance in propagation loss between forward link and reverse link, the non-primary BS receives uncontrolled power from the MS. Under the embodiment, this problem can be addressed only when the non-primary BS 206 requests the primary BS 204 to send a DOWN rate control command. The non-primary BS can send the request to the primary BS directly, or through the communication system infrastructure or backhaul, or in other ways appropriate to the system configuration.

In this rate control approach, the rate control algorithm is not completely defined in the mobile environment, when the MS 202 performs cell switching. Before cell switching, the BS 204 is the primary BS while BS(s) 206 are the non-primary BS. Due to the mobile motion, the received signal from a non-primary BS 206 may become stronger than the signal from the primary BS 204. Therefore, during cell switching, the MS 202 transmits switching frames indicating 206 as its new primary BS. Before the switching frames are decoded by a base station, the BS 204 regards itself as the primary BS for the MS 202. The problem occurs as the MS 202 doesn't know when to regard BS 206 as its new primary BS and start listening to the RC bit from the BS 206. This problem can be addressed by having the MS 202 listen to rate control commands from both the primary and non-primary BSs during cell switching and apply an OR-of-HOLD rule, where the MS will hold its data rate if either BS sends a HOLD command, followed by applying the OR-of-DOWN rule, where the MS will decrease its data rate if either BS commands a lower data rate. This approach gives the two BS more control over the MS 202 transmission. In yet another embodiment that addresses this problem, the MS 202 listens to the rate control command only from the previous primary BS 204 during the switching period. Only when last switching indicator is sent or the MS 202 receives an acknowledgement of the switch, it starts listening to the rate control command from the BS 206, the new primary BS. The BS 206 starts sending a rate control command as soon as it decodes the switching indicator. During the period, the switch indicator is decoded by a BS to the time the MS receives an acknowledgement, the MS 202 listens to rate control bit(s) from the BS 204 while the BS 206 sends the rate control bit(s). Because a lack of transmission of rate control in the forward rate control channel (F-RCCH) from the BS 204 will be interpreted as HOLD by the MS 202, neither of the base stations will be able to change the rate of the MS 202 during this interim period.

Case III

In this technique all cell sectors in the MS Active Set contribute to the control of the MS data rate. This control is referred to as being symmetric, with the MS active Set members controlling the MS ramp-up with an OR-of-DOWN rule followed by OR-of-HOLD rule. This technique has an advantage that in all BSs communicating with the MS will contribute to the control the data rate of the MS transmission and so the ROT of a base station is less dramatically affected by any single MS and is more controlled. The technique operates similarly in both soft handoff and cell switching.

However, there are multiple problems with this technique, particularly in scenarios where the multiple base stations in soft-handoff are not co-located and the decoding decisions of each are not known to other base stations by the time each BS makes its rate control decision. For example, in a system with hybrid automatic repeat request (HARQ), a new packet is not transmitted by a MS until it receives ACK from one of the base stations in soft-handoff or until the MS has transmitted a packet for maximum allowed number of times. Therefore, when the previous transmission is not the last transmission of a packet, the base station doesn't know whether it can schedule the MS for a new transmission unless it decodes the previous transmission and ACKs the mobile station. In absence of this knowledge, the BS that doesn't ACK the mobile stations previous transmission may send a HOLD command to save power on the forward link. However, by OR-of-HOLD rule, the MS will not be able to increase its transmission rate unless all the base stations ACK the mobile station at the same time. To circumvent this problem, the base station that doesn't ACK the MS has to send an UP rate control command all the time. This includes the times when MS is not transmitting anything on its reverse packet channel since the base station may not be able to distinguish no transmission from transmission not decoded. This is highly power inefficient, since each BS wastes the forward-link power in sending an UP rate control command all those times, the base station doesn't send an ACK to the mobile station Case IV In this embodiment, all cell sectors in the MS Active Set control the MS ramp-up with an OR-of-DOWN rule followed by OR-of-HOLD rule, similar to Case III. However, unlike Case III, the control is asymmetric with the primary BS providing the fundamental regulation of the MS data rate ramp-up while the non-primary BSs provide congestion control. In other words, the primary sector sends a tri-state rate control (−1, 0, +1) command based on a desired QoS to the MS where no transmission (0) on rate control bit in rate control channel corresponds to the HOLD. Non-primary BSs sends an ON-OFF (−1, 0) rate control bit where no transmission (0) corresponds to UP or Don't Care while an ON state corresponds to DOWN. The non-primary BS may send rate control command based on the congestion level of the respective non-primary BS. The non-primary BSs send an UP rate command to the MS if the non-primary BS is not congested and a DOWN rate command if the non-primary BS is congested. For example, the non-primary BS may send an UP rate command if its ROT indicates a low congestion level and a DOWN rate command if its ROT indicates a high congestion level. In this embodiment, the rate control bit from BS 206 may be common to all mobile stations 202 for which the BS 206 is non-primary.

Note that the above approach spends very little power on forward link of non-primary base stations since the UP command corresponds to no transmission on the rate control bit. A DOWN command from non-primary BS may be send only if the system is severely congested, thereby providing some control to the non-primary base stations, mentioned as a drawback of the Case II. For example, if it is determined that the sector's ROT exceeds a predetermined value, such as 7 or 8 dB, then the non-primary BS is considered to be congested and it sends a rate command of −1 representing a DOWN rate command. Otherwise the non-primary BS is considered not congested and a rate command of 0 representing an UP command is sent. Because it is less likely for the system to be over-loaded for a long period of time, a DOWN command is send rarely. For most of the time, in this embodiment, a non-congested BS will send a rate command of 0, which is the same as sending no command. Because the non-congested BS sends no rate command, this technique therefore does not consume too much power from the non-primary sector.

Since this approach is asymmetric, the rate control in soft-handoff needs to be specified as in case of cell-switching as in Case II. During cell switching a more conservative approach may be followed. In an embodiment, the MS decodes the rate control bit(s) from both the primary BS 204 (the base station whose coverage area the MS is leaving) and non-primary BS 206 (the base station whose coverage area the MS is entering) as a tri-state value of −1, 0, or 1 representing DOWN, HOLD, UP respectively. The cell switching operation begins when the MS sends a CELL_SWITCH_INDICATOR signal indicating BS 206 as its new primary BS. During the period from the beginning of the switching operation until the MS receives an END_SWITCH_INDICATOR (acknowledgement from the base station indicating the switch operation is completed) or NUM_SOFT_SWITCHING_FRAMES indicators have been sent, the MS uses the same logic to interpret rate control bit(s) from both the BS 204 and BS 206. During this period, the MS applies OR-of-HOLD rule followed by OR-of-DOWN rule on the rate control commands from the BS 204 and BS 206. During the switching period, the MS 202 is not able to increase the rate even if the new primary BS 206 sends an UP command due to OR-of-HOLD rule. Thus the approach is conservative during the switching period.

In yet another embodiment, during the switching period, the MS 202 interprets the rate control command from BS 204 as a tri-state command (−1, 0, 1) while interpreting the rate control command from BS 206 as an ON-OFF command (−1, 0). After the MS 202 receives an END_SWITCH_INDICATOR indicating BS 206 as its new primary BS or has sent NUM_SOFT_SWITCHING_FRAMES indicating the switch, the MS starts interpreting rate control command from BS 204 as ON-OFF and rate control command from BS 206 as a tri-state command. This approach is more aggressive than the previously described techniques because it allows the BS 204 to increase the rate of the MS 202 before it decodes the CELL_SWITCH_INDICATOR. During the period, the CELL_SWITCH_INDICATOR is decoded by a BS to the time the MS receives an END_SWITCH_INDICATOR, the MS 202 is not able to increase the rate even if the new primary BS 206 sends an UP command since the rate control command from the previous primary BS 204 will be interpreted as HOLD by the MS.

Techniques of Combining Multiple Rate Control Indicators

A generalized technique for combining multiple rate control indicators includes applying weighting factors to the different rate control commands received. For example, the primary base station may be assigned a larger weighting factor than non-primary base stations in a MS Active Set. The weighted rate command indicators can then be combined to produce an aggregate rate command that is used to control the data rate of the MS. As discussed above, Case III corresponds to a case when equal weighting is applied to the rate control commands received from all the base stations in mobile stations active set. Case IV is a special case of weighting applied to the rate control commands where 0 weighting is applied to the HOLD command from a non-primary BS. The different special cases of the weighting technique for interpreting and combining the rate control indicators the MS receives from its Active Set members are described below.

Rate Control Combining Rules for Common/Group Rate Control

If a MS receives an ACK, or after its last subpacket, the MS decodes rate control indicators from all the F-RCCHs that have been assigned to the MS by members of the MS active set. Every rate control indicator has three states: DOWN, HOLD, and UP. The effect of a rate control command is to change the authorized T/P by certain amount, where authorized T/P is the maximum allowed "traffic to pilot" ratio that the mobile station is allowed to transmit at and is used as an indication of the MS data rate that can be supported. In one embodiment, the MS combines all the rate control indictors it receives based on the following OR-of-DOWN rules:

If any indicator is a DOWN, then the MS decreases its authorized T/P by a predetermined amount from the current level.

If no indicator is a DOWN and at least one indictor is a HOLD, then the MS maintains the current authorized T/P level.

Otherwise, all indicators are UP and the MS increases its authorized T/P by a predetermined amount from the current level.

It is noted that the predetermined amounts that a MS increases or decreases from its current authorized T/P may be the same, or they may be different depending on the current authorized T/P of the MS.

Rate Control Combining Rules for Dedicated Rate Control

For dedicated rate control, if a MS receives an ACK on the F-ACKCH from a BS, it decodes all the F-RCCHs that are assigned to the MS, regardless of whether or not the MS receives an ACK from a BS. The robustness of a communication system that uses this reception procedure can be improved using the following weighting techniques.

The rate control indicator from the primary BS has three states: RATE_DECREASE, RATE_HOLD, and RATE_INCREASE.

Rate control indicator from a non-primary BS has two states: RATE_DECREASE and RATE_HOLD. This can be interpreted as a weighting technique where the RATE_HOLD and RATE_INCREASE state of rate control indicator from the non-primary BS is weighted by a NULL factor.

MS combines desired rate control indictors based on the following rules:

If any indicator is a RATE_DECREASE, then the MS decreases its rate by a desired amount, for example by one.

If no indicator is a RATE_DECREASE and at least one indictor is a RATE_HOLD, then the MS maintains the current rate.

If no indicator is a RATE_DECREASE or a RATE_HOLD, and at least one indictor is a RATE_INCREASE, then the MS increases its rate by a desired amount, for example by one.

Otherwise, all rate control indicators are RATE_HOLD and the MS maintains the current rate.

It is noted that the MS combines desired rate control indicators which can include the rate control indicators of all of the MS active set members, or can include the rate control indicators of only some of the MS active set members.

Procedure During Cell Switching for Dedicated Rate Control:

After a MS initiates a cell switching operating by sending a CELL_SWITCH_INDICATOR, the MS assumes that the control rate indicators from both the old primary BS and the new primary BS each have three states: RATE_DECREASE, RATE_HOLD, and RATE_INCREASE. The rate control indicators from all other non-primary BS remains unchanged, and have two states: RATE_DECREASE and NULL_INDICATION. The rate control indicators are combined using the same combining rules described immediately above.

Upon receiving an END_SWITCH_INDICATOR, or after sending NUM_SOFT_SWITCHING_FRAMES, the MS assumes that the rate control indicator from the new primary BS has three states: RATE_DECREASE, RATE_HOLD, and RATE_INCREASE. The rate control indicators from all other non-primary BSs, including the old primary BS, have two states: RATE_DECREASE and NULL_INDICATION. The rate control indicators are combined based on the same combining rules described immediately above.

An alternative approach is to define the states of the F-RCCH from a non-primary BS "on the fly" based on what is received on the corresponding F-ACKCH from the associated BS. For this approach the following procedure is used:

If an ACK is received from an F-ACKCH, then the MS interprets that the corresponding F-RCCH from the same non-primary BS has three states: RATE_DECREASE, RATE_HOLD, and RATE_INCREASE.

If no ACK is received from an F-ACKCH (after last subpacket), then the MS interprets that the corresponding F-RCCH from the same non-primary BS has two states: RATE_DECREASE and NULL_INDICATION.

All other rules for combining remain the same as described immediately above.

Figure 3:
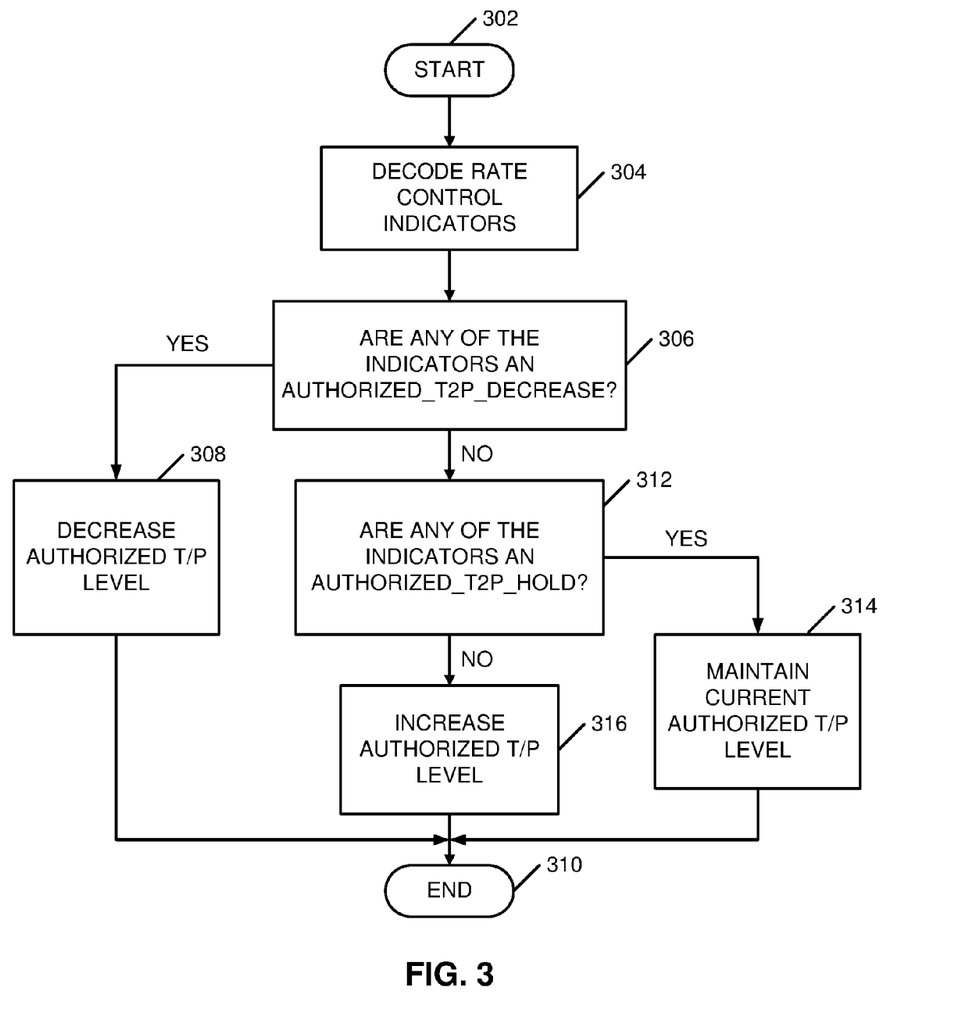
FIG. 3 is a flow chart illustrating a technique for combining rate control indicators for common/group rate control.

FIG. 3 is a flow chart illustrating a technique for combining rate control indicators for common/group rate control. In a common/group rate control scheme, one rate control command is sent that is monitored by all the mobile stations or a group of mobile stations in the coverage area of the base station. Flow begins in block 302. In block 304 a MS decodes rate control indicators received from members of the MS active set of a BS. In block 306 the MS determines if any of the rate control indicators is an AUTHORIZED_T2P_DECREASE (DOWN rate control command). If at least one of the indicators is an AUTHORIZED_T2P_DECREASE, a "YES" outcome, then flow continues to block 308. In block 308 the MS decreases its authorized T/P (Traffic to Pilot) level by a predetermined amount. Flow then continues to block 310 where the combining process ends.

Returning to block 306, if none of the indicators is an AUTHORIZED_T2P_DECREASE, a "NO" outcome, then flow continues to block 312. In block 312, the MS determines if any of the rate control indicators is an AUTHORIZED_T2P_HOLD (HOLD rate control command). If at least one of the indicators is an AUTHORIZED_T2P_HOLD, a "YES" outcome, then flow continues to block 314. In block 314 the MS maintains its current authorized T/P level. Flow then continues to block 310 where the process ends.

Returning to block 312, if none of the indicators is an AUTHORIZED_T2P_HOLD, a "NO" outcome, then all of the indicators must be AUTHORIZED_T2P_INCREASE (UP rate control command) because the indicators can only be one of three values, either AUTHORIZED_T2P_DECREASE, AUTHORIZED_T2P_HOLD, or AUTHORIZED_T2P_INCREASE. Therefore, in block 312, if none of the indicators is an AUTHORIZED_T2P_HOLD, flow continues to block 316. In block 316 the MS increases its authorized T/P by a predetermined amount. Flow then continues to block 310 where the process ends.

Figure 4:
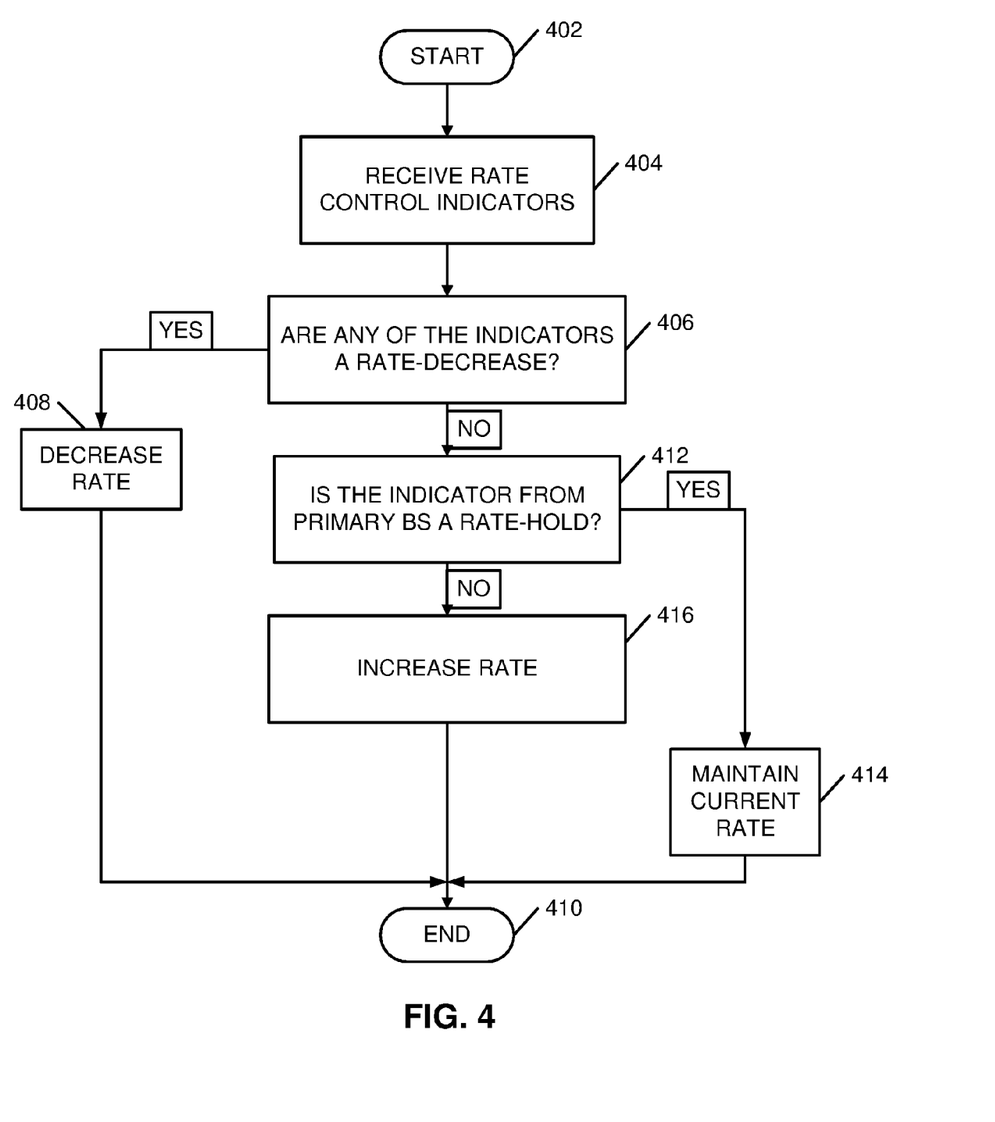
FIG. 4 is a flow chart illustrating a technique for combining rate control for a dedicated rate channel.

FIG. 4 is a flow chart illustrating a technique for combining rate control for a dedicated rate control approach. In the dedicated rate control approach, a separate rate control command specific to each mobile station is sent for all MS. Flow begins in block 402. In block 404 a MS decodes rate control indicators received from primary and non-primary BS. A rate control indicator from a primary BS can either be a RATE_DECREASE, RATE_HOLD, or RATE_INCREASE. A rate control indicator from a non-primary BS can be either RATE_DECREASE or NULL_INDICATION. Flow continues to block 406. In block 406 the MS determines if any of the rate control indicators is a RATE_DECREASE. If at least one of the indicators is an RATE_DECREASE, a "YES" outcome at block 406, then flow continues to block 408. In block 408 the MS decreases its data rate. For example, the MS may decrease its data rate by a value of one. Flow then continues to block 410 where the combining process ends.

Returning to block 406, if none of the indicators is an RATE_DECREASE, a "NO" outcome at block 406, then flow continues to block 412. In block 412, the MS determines if the rate control indicator from the primary BS is a RATE_HOLD. If at least one of the indicators is an RATE_HOLD, then flow continues to block 414. In block 414 the MS maintains its current data rate. Flow then continues to block 410 where the process ends.

Returning to block 412, if none of the indicators is a RATE_HOLD, a "NO" outcome, then flow continues to block 416. In block 416, since none of the indicators is RATE_DECREASE and the indicator from primary BS is not a RATE_HOLD, the MS increases its data rate. Flow then continues to block 410 where the process ends.

Figure 5:
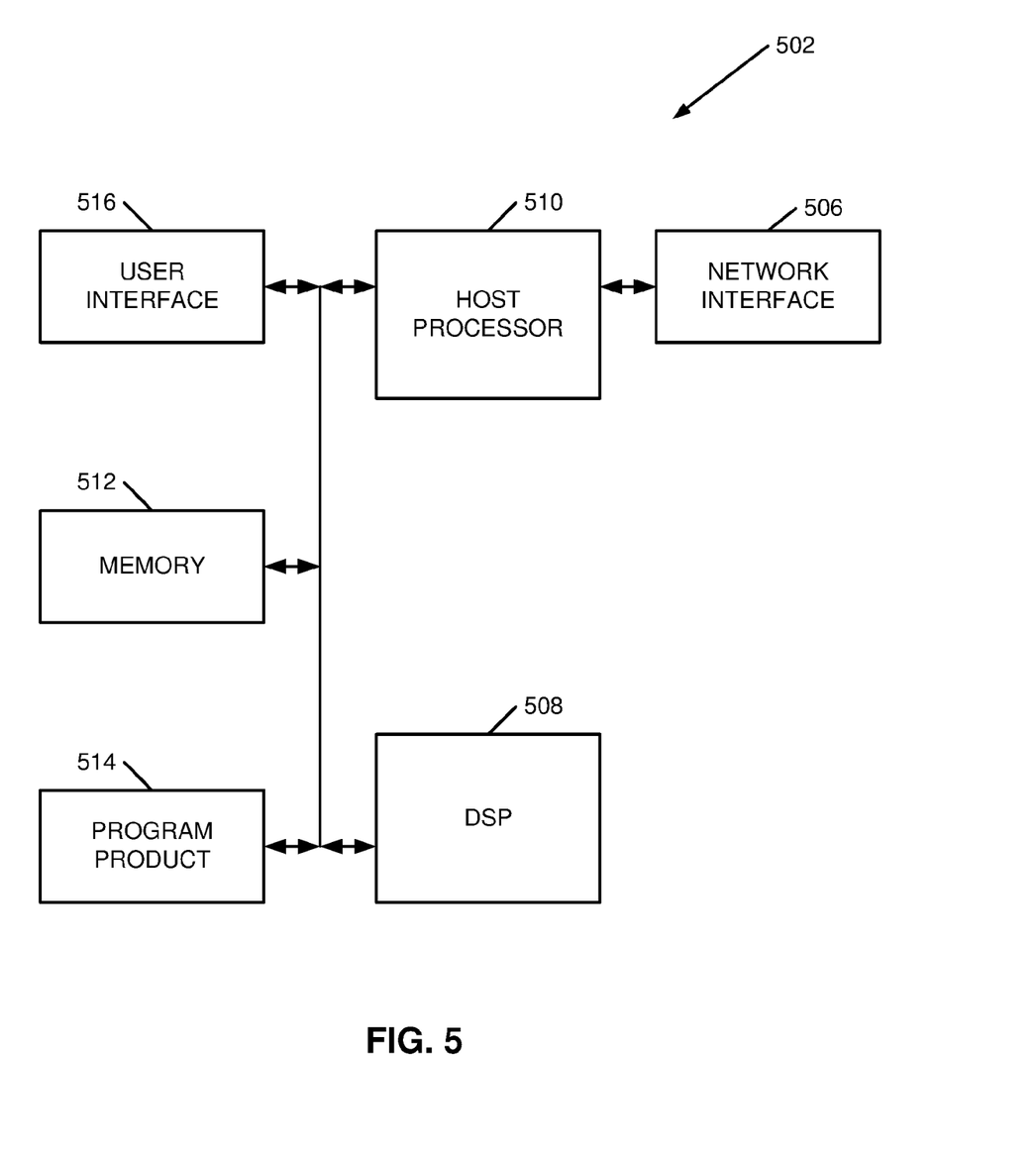
FIG. 5 is a block diagram of a wireless communication device constructed in accordance with an exemplary embodiment of the present invention.

FIG. 5 is a block diagram of a wireless communication device constructed in accordance with an exemplary embodiment of the present invention. The communication device 502 includes a network interface 506, digital signal processor (DSP) 508, a host processor 510, a memory device 512, a program product 514, and a user interface 516.

Signals from the infrastructure are received by the network interface 506 and sent to the host processor 510. The host processor 510 receives the signals and, depending on the content of the signal, responds with appropriate actions. For example, the host processor 510 may determine a data rate in accordance with the received signals itself, or it may route the received signals to the DSP 508 for determining a data rate.

In one embodiment, the network interface 506 may be a transceiver and an antenna to interface to the infrastructure over a wireless channel. In another embodiment, the network interface 506 may be a network interface card used to interface to the infrastructure over landlines.

Both the host processor 510 and the DSP 508 are connected to a memory device 512. The memory device 512 may be used to store data during operation of the WCD, as well as store program code that will be executed by the host processor 510 or the DSP 508. For example, the host processor, DSP, or both, may operate under the control of programming instructions that are temporarily stored in the memory device 512. The host processor and DSP also can include program storage memory of their own. When the programming instructions are executed, the host processor 510 or DSP 508, or both, perform their functions, for example compression or decompression of data packets. Thus, the programming steps implement the functionality of the respective host processor or CPU, and DSP, so that the host processor and DSP can each be made to perform the functions of determining a data rate as desired. The programming steps may be received from a program product 514. The program product 514 may store, and transfer the programming steps into the memory 512 for execution by the host processor, CPU, or both.

The program product 514 may be semiconductor memory chips, such as RAM memory, flash memory, ROM memory, EPROM memory, EEPROM memory, registers, as well as other storage devices such as a hard disk, a removable disk, a CD-ROM, DVD storage, or any other form of storage medium known in the art that may store computer readable instructions. Additionally, the program product 514 may be the source file including the program steps that is received from the network and stored into memory and is then executed. In this way, the processing steps necessary for operation in accordance with the invention may be embodied on the program product 514. In FIG. 5, the exemplary storage medium is shown coupled to the host processor such that the host processor may read information from, and write information to, the storage medium. Alternatively, the storage medium may be integral to the host processor.

The user interface 516 is connected to both the host processor 510 and the DSP 508. For example, the user interface may include a keypad, or special function keys or buttons, that are routed to the host processor 510 and may be used by a user to request specific operation by the initiating device. The user interface 516 may also include a speaker that is connected to the DSP 510 and used to output audio data to the user.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of controlling a data rate of a transmission in a wireless communication system during handoff, the method comprising:
   receiving transmissions from a primary base station and a non-primary base station during a handoff process, wherein each received transmission includes a data rate control indicator; and
   adjusting the data rate of the transmission during handoff based on the data rate control indicators from the primary and non-primary base stations, wherein adjusting the data rate of the transmission comprises:
   decreasing the data rate of the transmission responsive to determining that at least one of the data rate control indicators indicates to decrease the data rate of transmission; and
   maintaining the data rate of transmission responsive to determining that the data rate control indicator from the primary base station does not indicate to increase or decrease the data rate of transmission and the data rate control indicator from the non-primary base station does not indicate to decrease the data rate of transmission.

2. The method as defined in claim 1, wherein adjusting the data rate of the transmission further comprises increasing the data rate of transmission responsive to determining that none of the data rate control indicators indicates to decrease the data rate of transmission or to hold the data rate of transmission.

3. The method as defined in claim 1, wherein adjusting the data rate of the transmission further comprises maintaining the data rate of transmission responsive to determining that none of the data rate control indicators indicates to decrease the data rate of transmission, to hold the data rate of transmission, or to increase the data rate of transmission.

4. The method as defined in claim 1, wherein the primary base station controls ramp-up of the data rate of the transmission.

5. The method as defined in claim 1, wherein the non-primary base station provides information on system congestion.

6. The method as defined in claim 1, wherein adjusting the data rate of the transmission comprises interpreting the data rate control indicator from the primary base station as a tri-state rate control indicator and interpreting the data rate control indicator from the non-primary base station as a two-state rate control indicator.

7. The method as defined in claim 6, wherein the tri-state rate control indicator has three states comprising a rate-increase state, a rate-hold state, and a rate-decrease state.

8. The method as defined in claim 6, wherein the two-state rate control indicator has two states comprising a rate-hold state and a rate-decrease state.

9. The method as defined in claim 1, wherein a first one of the received transmissions further includes an acknowledgement message, a second one of the received transmissions does not include an acknowledgement message, and adjusting the data rate of the transmission comprises interpreting the data rate control indicator of the first one of the received transmissions as a tri-state rate control indicator and interpreting the data rate control indicator of the second one of the received transmissions as a two-state rate control indicator.

10. A method of controlling a data rate of a transmission in a wireless communication system during handoff, the method comprising:
    receiving transmissions from a plurality of base stations, wherein each received transmission includes a data rate control indicator during a handoff process, and one of the plurality of base stations is designated as a primary base station; and
    adjusting the data rate of the transmission during handoff based on the data rate control indicators from the plurality of base stations, wherein adjusting the data rate of the transmission comprises:
    decreasing the data rate of the transmission responsive to determining that at least one of the data rate control indicators indicates to decrease the data rate of transmission;
    maintaining the data rate of transmission responsive to determining that none of the data rate control indicators indicates to decrease the data rate of transmission and the data rate control indicator from the primary base station indicates to hold the data rate of transmission; and
    increasing the data rate of transmission responsive to determining that none of the data rate control indicators indicates to decrease the data rate of transmission and the data rate control indicator from the primary base station indicates to increase the data rate of transmission or is a null indication.

11. An apparatus for controlling a data rate of a transmission in a wireless communication system during handoff, the apparatus comprising:
    a receiver configured to receive transmissions from a primary base station and a non-primary base station during a handoff process, wherein each received transmission includes a data rate control indicator; and a processor configured to adjust the data rate of the transmission during handoff based on the data rate control indicators from the primary and non-primary base stations, wherein the processor is configured to adjust the data rate of the transmission by:

decreasing the data rate of the transmission responsive to determining that at least one of the data rate control indicators indicates to decrease the data rate of transmission; and maintaining the data rate of transmission responsive to determining that the data rate control indicator from the primary base station does not indicate to increase or decrease the data rate of transmission and the data rate control indicator from the non-primary base station does not indicate to decrease the data rate of transmission.

12. The apparatus as defined in claim 11, wherein the processor is further configured to adjust the data rate of transmission by increasing the data rate of transmission responsive to determining that none of the data rate control indicators indicates to decrease the data rate of transmission or to hold the data rate of transmission.

13. An apparatus for controlling a data rate of a transmission in a wireless communication system during handoff, the apparatus comprising:

a receiver configured to receive transmissions from a plurality of base stations during a handoff process, wherein each received transmission includes a data rate control indicator, and one of the plurality of base stations is designated as a primary base station; and a processor configured to adjust the data rate of the transmission during handoff based on the data rate control indicators from the plurality of base stations, wherein the processor is configured to adjust the data rate of the transmission by:

decreasing the data rate of the transmission responsive to determining that at least one of the data rate control indicators indicates to decrease the data rate of transmission;

maintaining the data rate of transmission responsive to determining that none of the data rate control indicators indicates to decrease the data rate of transmission and the data rate control indicator from the primary base station indicates to hold the data rate of transmission; and increasing the data rate of transmission responsive to determining that none of the data rate control indicators indicates to decrease the data rate of transmission and the data rate control indicator from the primary base station indicates to increase the data rate of transmission or is a null indication.

14. An apparatus for controlling a data rate of a transmission in a wireless communication system during handoff, the apparatus comprising:

means for receiving transmissions from a primary base station and a non-primary base station during a handoff process, wherein each received transmission includes a data rate control indicator; and means for adjusting the data rate of the transmission during handoff based on the data rate control indicators from the primary and non-primary base stations, wherein the means for adjusting the data rate of the transmission comprises:

means for decreasing the data rate of the transmission responsive to determining that at least one of the data rate control indicators indicates to decrease the data rate of transmission; and means for maintaining the data rate of transmission responsive to determining that the data rate control indicator from the primary base station does not indicate to increase or decrease the data rate of transmission and the data rate control indicator from the non-primary base station does not indicate to decrease the data rate of transmission.

15. The apparatus as defined in claim 14, wherein the means for adjusting the data rate of the transmission further comprises means for increasing the data rate of transmission responsive to determining that none of the data rate control indicators indicates to decrease the data rate of transmission or to hold the data rate of transmission.

16. An apparatus for controlling a data rate of a transmission in a wireless communication system during handoff, the method comprising:

means for receiving transmissions from a plurality of base stations during a handoff process, wherein each received transmission includes a data rate control indicator, and one of the plurality of base stations is designated as a primary base station; and means for adjusting the data rate of the transmission during handoff based on the data rate control indicators from the plurality of base stations, wherein the means for adjusting the data rate of the transmission comprises:

means for decreasing the data rate of the transmission responsive to determining that at least one of the data rate control indicators indicates to decrease the data rate of transmission;

means for maintaining the data rate of transmission responsive to determining that none of the data rate control indicators indicates to decrease the data rate of transmission and the data rate control indicator from the primary base station indicates to hold the data rate of transmission; and means for increasing the data rate of transmission responsive to determining that none of the data rate control indicators indicates to decrease the data rate of transmission and the data rate control indicator from the primary base station indicates to increase the data rate of transmission or is a null indication.

17. A non-transitory computer-readable storage medium having instructions stored thereon that, when executed by one or more processors, cause the one or more processors to perform operations comprising:

receiving transmissions from a primary base station and a non-primary base station during a handoff process, wherein each received transmission includes a data rate control indicator; and adjusting the data rate of the transmission during handoff based on the data rate control indicators from the plurality of base stations, wherein adjusting the data rate of the transmission comprises:

decreasing the data rate of the transmission responsive to determining that at least one of the data rate control indicators indicates to decrease the data rate of transmission; and maintaining the data rate of transmission responsive to determining that the data rate control indicator from the primary base station does not indicate to increase or decrease the data rate of transmission and the data rate control indicator from the non-primary base station does not indicate to decrease the data rate of transmission.

18. The non-transitory computer readable medium as defined in claim 17, wherein adjusting the data rate of the transmission further comprises increasing the data rate of transmission responsive to determining that none of the data rate control indicators indicates to decrease the data rate of transmission or to hold the data rate of transmission.

19. A non-transitory computer-readable storage medium having instructions stored thereon that, when executed by one or more processors, cause the one or more processors to perform operations comprising:
   receiving transmissions from a plurality of base stations, wherein each received transmission includes a data rate control indicator during a handoff process, and one of the plurality of base stations is designated as a primary base station; and
   adjusting the data rate of the transmission during handoff based on the data rate control indicators from the plurality of base stations, wherein adjusting the data rate of the transmission comprises:
      decreasing the data rate of the transmission responsive to determining that at least one of the data rate control indicators indicates to decrease the data rate of transmission;
      maintaining the data rate of transmission responsive to determining that none of the data rate control indicators indicates to decrease the data rate of transmission and the data rate control indicator from the primary base station indicates to hold the data rate of transmission; and
      increasing the data rate of transmission responsive to determining that none of the data rate control indicators indicates to decrease the data rate of transmission and the data rate control indicator from the primary base station indicates to increase the data rate of transmission or is a null indication.

* * * * *